(Specimens.)

A. S. MITCHELL & T. K. EWING.
POROUS EARTHENWARE.

No. 540,180. Patented May 28, 1895.

WITNESSES,
w.H.W.Wood.
E. W. Stint

INVENTORS,
Andrew S. Mitchell
Thomas K. Ewing.
By John E. Wiles.
ATTORNEY.

UNITED STATES PATENT OFFICE.

ANDREW S. MITCHELL AND THOMAS K. EWING, OF MILWAUKEE, WISCONSIN.

POROUS EARTHENWARE.

SPECIFICATION forming part of Letters Patent No. 540,180, dated May 28, 1895.

Application filed July 9, 1894. Serial No. 516,970. (No model.)

*To all whom it may concern:*

Be it known that we, ANDREW S. MITCHELL and THOMAS K. EWING, citizens of the United States, residing at Milwaukee, county of Milwaukee, State of Wisconsin, have invented a certain new and useful Improvement in Porous Earthenware; and we declare the following to be a full, clear, and exact description of the invention, such as will enable others skilled in the art to which it pertains to make and use the same, reference being had to the accompanying drawings, which form a part of this specification.

Our invention relates to new and useful improvements in the manufacture of porous earthenware, and consists in the matters hereinafter described and pointed out in the appended claims.

Figure 1:
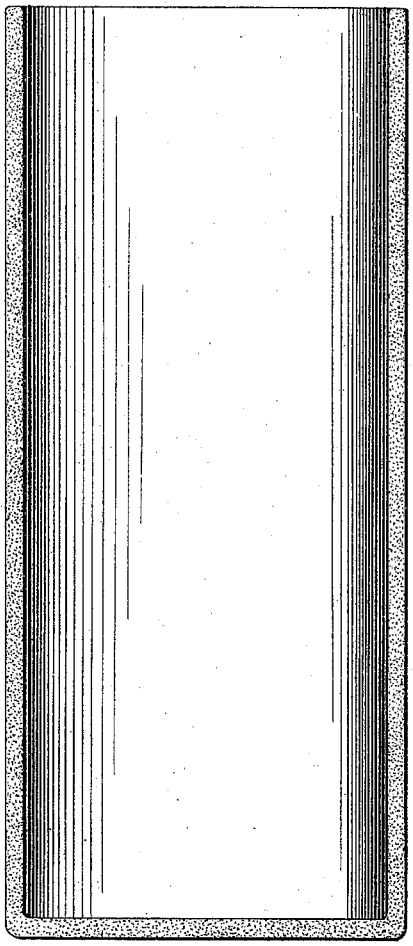
Figure 2:
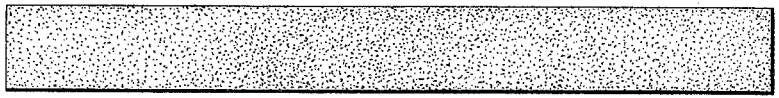
Figure 3:

In the accompanying drawings, illustrating our invention, Figure 1 is a central vertical sectional view of a porous battery-jar constructed in accordance with our invention. Fig. 2 is a sectional view of a porous diaphragm or partition. Fig. 3 is a similar view of a somewhat different form of the same.

Heretofore in the construction of porous earthenware, for electric batteries, it has been common, where addition is made to the clay, to render the ware porous, to mix the clay with finely divided sawdust, starch, flour or other material capable of being burned out in the operation of baking or burning the ware. This has resulted in the production of porous ware, the spaces occupied by the small particles of sawdust or other material which was mixed with the clay, forming the pores for the percolation of liquids through the walls of the ware. In this method of construction, however, considerable difficulty has been experienced in the construction of a satisfactory article of porous ware, from the fact that in order to obtain the desired degree of porosity it is necessary to mix with the clay a considerable portion of the sawdust or analogous material. This results in the formation of pores of irregular size, which in some instances will permit two liquids which are separated by the porous vessel or diaphragm to rapidly intermix through the walls of the porous vessel, the larger pores permitting the free percolation of salts or acids in solution through the porous wall or walls, thus necessitating a frequent renewal of the battery fluids. When less sawdust or analogous material is used, the porosity of the ware is proportionately reduced, and the walls of the vessel being less permeable to fluids, the internal electrical resistance of the cell is thereby greatly increased. Furthermore, in porous ware, as usually made, the pores are not continuous or communicating throughout the porous wall or walls, but end largely in blind sacs which are useless for the purpose intended. This is the result of the manufacture of porous ware from a dense and laminated material. Furthermore, when pores are produced by the occlusion and subsequent burning out of carbonaceous matter, the pores are irregular in size and shape, so that it is possible for particles of substances in suspension to enter the larger pores upon the surface of the ware. These particles are subsequently arrested in their progress by smaller inner pores, thus partially or wholly clogging or preventing the passage of fluids through the walls of the cell, and deposited in such a manner as to render it impossible to cleanse the vessel by the ordinary process of cleaning or scrubbing its surface. Thus it is essential in the formation of porous ware, for battery purposes, that the ware shall possess a high degree of porosity, and be sufficiently permeable to the battery fluids to offer low electrical resistance in the circuit, but that the pores shall be exceedingly minute, and of a uniform size and even distribution. For this reason it is very desirable that the material composing the porous ware shall possess a high degree of porosity but that the pores shall be exceedingly minute, as well as uniform in size.

It is the object of our invention to effectually overcome the aforesaid difficulties, and to provide an improved article of porous ware possessing the above-mentioned desirable qualities.

To this end, our invention consists primarily in the construction of articles of porous ware from diatomaceous or silicious infusorial earth, as will be presently described. Such earth is of a structure very finely reticulated or lattice-like, in which the pores are very minute but uniform in size and shape, and continuous or communicating with each other throughout the mass, as distinguished from the before described porous ware constructed from a dense and laminated material.

In preparing or molding the diatomaceous material to the desired shape for the formation of porous earthenware, preparatory to burning or firing the ware, we find it desirable to combine with said diatomaceous earth, a sufficient proportion of fluxing material to cause the mass to properly frit during the operation of burning or firing. For this purpose, we find that carbonate of potash or almost any other material containing potash in sufficient quantity, or many of the alkaline earths will serve as fluxing material, in the manufacture of our improved ware.

We may construct the ware entirely from the diatomaceous or silicious infusorial earth, combined with the flux, where thick or heavy walls are desired, as in the form of plate or partition shown in Fig. 2. When greater plasticity is required as in the formation of vessels or articles of porous ware having thinner or lighter walls, such for instance as shown in Figs. 1 and 3, we find it desirable to mix with the aforesaid material, a sufficient proportion of kaolin and sufficient of the fluxing material to cause it to frit. By the addition of the kaolin the plasticity of the mass is increased in proportion to the amount of kaolin used. However, on account of the difference in the structure of the kaolin from that of the described diatomaceous earth, the porosity of the ware is reduced in proportion to the amount of kaolin used. By mixing a suitable proportion of the aforesaid diatomaceous or silicious infusorial earth in combination with a suitable fluxing material with the material from which earthenware is made, we are enabled to render all classes of earthenware more or less porous, according to the proportion of the diatomaceous material used.

By our improvement we are enabled to provide porous earthenware having a high degree of porosity, the pores or openings very uniform in size and shape, and of such exceedingly small dimensions that while allowing a large area for contact of the liquids on either side of the porous partition, still the even distribution and extreme minuteness of pores allows but slow diffusion of salts or acids through its walls. At the same time, by reason of uniformity in the size of the pores, the plugging up or stoppage of the pores by reason of the accumulation of foreign matter therein is obviated, and particles of foreign matter which would be liable to materially interfere with the proper filtering action of the device, are arrested without being permitted to enter into the body of the porous material, and may be readily removed by scrubbing or washing the outside of the porous vessel, in an obvious manner. Porous ware of our improved construction therefore possesses the desirable qualities of extreme porosity combined with great regularity of size and even distribution of the pores, throughout the body of the ware, thus greatly reducing the electrical resistance when used for electric batteries.

Another advantage gained by our improvement is, that, the particles of foreign matter being arrested at the surface of the porous vessel, the vessel may be readily cleansed.

Having thus described our invention, what we claim as new, and desire to secure by Letters Patent of the United States, is—

1. An improved porous earthenware for electric batteries formed from a diatomaceous or silicious infusorial earth combined with a sufficient proportion of fluxing material to cause the mass to frit without vitrifying in the operation of burning or baking, substantially as described.

2. An improved porous earthenware for electric batteries consisting of a diatomaceous or silicious infusorial earth combined with kaolin and a sufficient proportion of fluxing material to cause the mass to frit without vitrifying during the operation of burning or baking the ware, substantially as described.

3. The herein described method of manufacturing porous earthenware consisting in combining a diatomaceous or silicious infusorial earth with a suitable fluxing material and then baking or burning the mass until it is properly fritted, substantially as described.

4. The herein described method of manufacturing porous earthenware consisting in combining a diatomaceous or silicious infusorial earth with kaolin and a sufficient proportion of fluxing material to cause the mass to frit without vitrifying during the operation of baking or burning the ware, molding or shaping, and finally baking or burning the mass until it is properly fritted, substantially as described.

In testimony whereof we sign this specification in the presence of two witnesses.

ANDREW S. MITCHELL.
THOMAS K. EWING.

Witnesses:
JOHN E. WILES,
THEO. F. TERHUNE.